Aug. 16, 1932.　　　　A. Y. DODGE　　　　1,872,127
ADJUSTMENT OF BRAKES

Filed Jan. 26, 1931

INVENTOR.
ADIEL Y. DODGE
BY
ATTORNEY

Patented Aug. 16, 1932

1,872,127

UNITED STATES PATENT OFFICE

ADIEL Y. DODGE, OF SOUTH BEND, INDIANA, ASSIGNOR TO BENDIX-COWDREY BRAKE TESTER, INC., OF SOUTH BEND, INDIANA, A CORPORATION OF DELAWARE

ADJUSTMENT OF BRAKES

Application filed January 26, 1931. Serial No. 511,128.

This invention relates to brakes and is illustrated as embodied in novel apparatus for the adjustment of brakes and will be described in connection with a novel method of making such adjustments.

For many purposes it is desirable to adjust the brakes of an automobile while the wheels and brake drums are removed, and one object of the invention is to provide apparatus for use in so adjusting the brakes without requiring the constant replacing and removal of the wheels. It is also often desirable that brakes be adjusted while the weight of the car is on the axle and for this reason I prefer to make provision in my novel apparatus for the supporting of the weight by means of the axle during adjustment of the brakes.

In one desirable arrangement I utilize a novel rotatable drum member having a cylindrical flange or portion simulating a brake drum and which is adapted to be placed in a position surrounding the friction means of the brake and which, for the reason pointed out above, is preferably provided with a head or other means adapted to engage and support the axle without interfering with the rotation of the drum member. I prefer to support this drum member in a manner permitting it to be readily rotated to facilitate the adjustment of the brake, and in the particular arrangement shown in the drawing this support comprises a base having rollers engaging and supporting the drum member, for example by being grooved to embrace a rib on the periphery of the drum member. The particular base illustrated can be rocked about a fulcrum to bring the rollers into engagement with the drum member before allowing the load of the axle to come fully upon it (by removing a supporting jack or the like) and is provided with an adjustable wedge or the like to hold the base in different angular positions with respect to its fulcrum. The drum member may also be provided with a lever or other means for turning it and with means such as a spring resisting such turning.

Another feature of the invention relates to a novel method of adjusting brakes, in which the above described apparatus is preferably, but not necessarily, utilized, by placing a drum member about the brake friction means and applying the brake there-against, while turning the drum member sufficiently to cause the shoes or other friction means to center themselves, whereupon the anchorage may be permanently located and made fast while the brake is held so applied. During this operation the weight of the car may be upon the drum or the drum may be hanging upon the axle, as desired. But certain advantages are secured by having the weight of the car on the drum.

The above and other objects and features of the invention, including various novel combinations of parts and desirable particular constructions, will be apparent from the following description of the illustrative embodiment shown in the accompanying drawing, in which.

Figure 1:
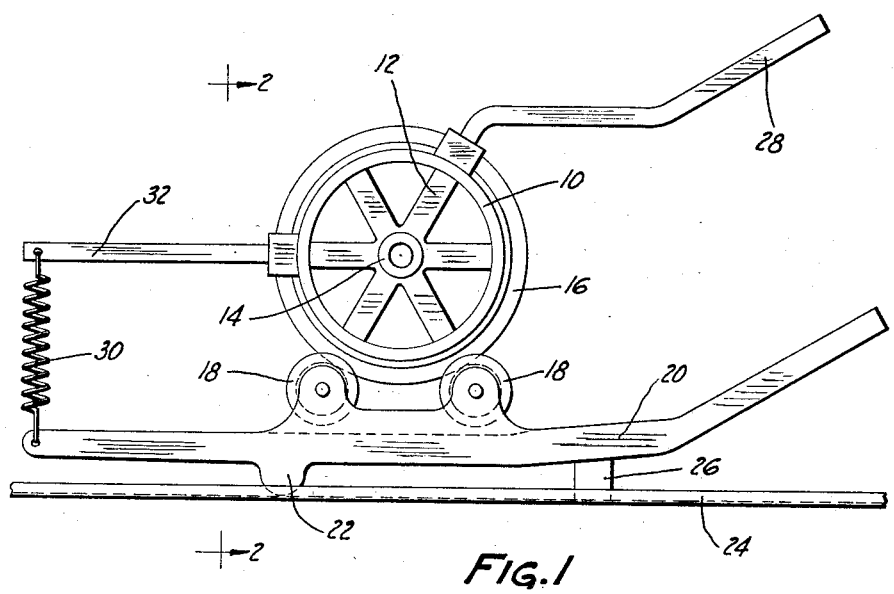
Figure 1 is a side elevation of the novel apparatus.
Figure 2:
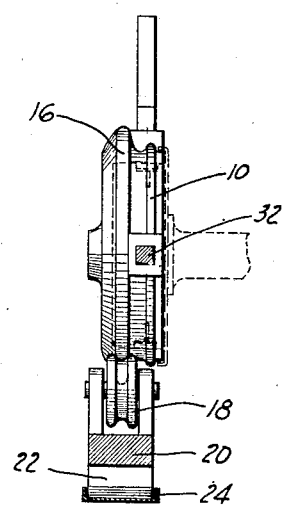
Figure 2 is a section on the line 2—2 of Figure 1 showing the apparatus in rear elevation.

As pointed out above, the apparatus preferably includes a rotatable drum member provided with a cylindrical flange or portion 10 simulating a brake drum and adapted to be placed in position surrounding the friction means of a brake on an automobile axle after the wheel has been removed. Preferably this drum member is provided with means such as a head or spider 12 formed with a hub 14 adapted to receive the end of an axle or spindle carrying the brake, so that the drum member can be rotated without interfering with the supporting of the axle.

The drum member in the form illustrated is shown provided with a peripheral rib 16 embraced by a pair of novel grooved rollers 18 forming part of the supporting means and shown as pivotally mounted on a base 20 which can be rocked about a fulcrum 22 engaging a suitable support such as a channel iron 24 on the floor. The base 20 can be rocked slightly, sufficiently to adjust the center of hub 14 with respect to the axle, or to raise the axle off of the jacks, by raising and lowering it about the fulcrum 22 and then shifting a wedge block 26 along the channel 24 to hold the base in its adjusted position.

The drum member is shown provided with a lever or handle 28 which can be manipulated to turn the drum member during the adjustment of the brake and also with means such as a coil spring 30 tensioned between the base 20 and a lever 32 carried by the drum member and which resists turning of the drum member by the handle 28.

It will be seen that this apparatus supports the weight by the axle the same as a wheel, but does not interfere with the adjustment of the brake as a wheel does, so that it can be manipulated by turning it somewhat while the brake is applied, with the anchorage loosely floating, to center the shoes or other friction means, whereupon while the brake is held applied the anchorage may be tightened permanently and other adjustments made.

While one illustrative apparatus has been described in detail, it is not my intention to limit the scope of the invention to that particular apparatus or otherwise than by the terms of the appended claims.

I claim:

1. Apparatus for operating on automobile brakes comprising, in combination, a drum member having a cylindrical portion simulating a brake drum and adapted to surround the friction means of a brake and having a central portion adapted to engage an axle carrying the brake, in combination with means for rotatably supporting said drum member.

2. Apparatus for operating on automobile brakes comprising, in combination, a drum member having a cylindrical portion simulating a brake drum and adapted to surround the friction means of a brake and having a central portion adapted to engage an axle carrying the brake, in combination with a support having rollers engaging and supporting said drum member.

3. Apparatus for operating on automobile brakes comprising, in combination, a drum member having a cylindrical portion simulating a brake drum and adapted to surround the friction means of a brake and having a central portion adapted to engage an axle carrying the brake, in combination with means for rotatably supporting said drum member, and means for turning said drum member about the brake.

4. Apparatus for operating on brakes comprising a supporting base having a fulcrum about which it can be rocked and provided with adjustable means for supporting the base in various angular positions with respect to its fulcrum, and a drum member rotatably supported by the base and having a cylindrical flange simulating a brake drum and adapted to surround the brake and also having means to engage and support an axle carrying the brake.

5. Apparatus of the class described comprising a rotatable drum member having an external rib, in combination with supporting means including rollers grooved to embrace said rib.

6. Apparatus of the class described comprising a base rotatably supporting a drum member, in combination with means for turning the drum member and means for yieldingly resisting the turning of the drum member.

7. Apparatus of the class described comprising a rotatable drum member having a cylindrical flange adapted to surround the friction means of a brake and having a pair of projecting levers, one of which is operable to turn the drum member, in combination with means engaging the other lever and yieldingly resisting the turning of the drum member.

8. That method of adjusting a brake which comprises surrounding the brake with a rotatable drum member, applying the brake, turning said drum member which also engages and supports the axle and is itself independently supported so as to be rotatable on its support to center the brake, and after the brake is so centered, tightening up its anchorage while the brake is held applied.

9. That method of adjusting a brake which comprises surrounding the brake with a rotatable drum member, applying the brake, turning said drum member which also engages and supports the axle and is itself independently supported so as to be rotatable on its support to center the brake, and after the brake is so centered, making adjustments while the brake is held applied.

In testimony whereof, I have hereunto signed my name.

ADIEL Y. DODGE.